March 3, 1970
G. C. SULLIVAN
3,498,626
METAL SKI AND METHOD OF FABRICATION
Filed Dec. 14, 1967
2 Sheets-Sheet 1
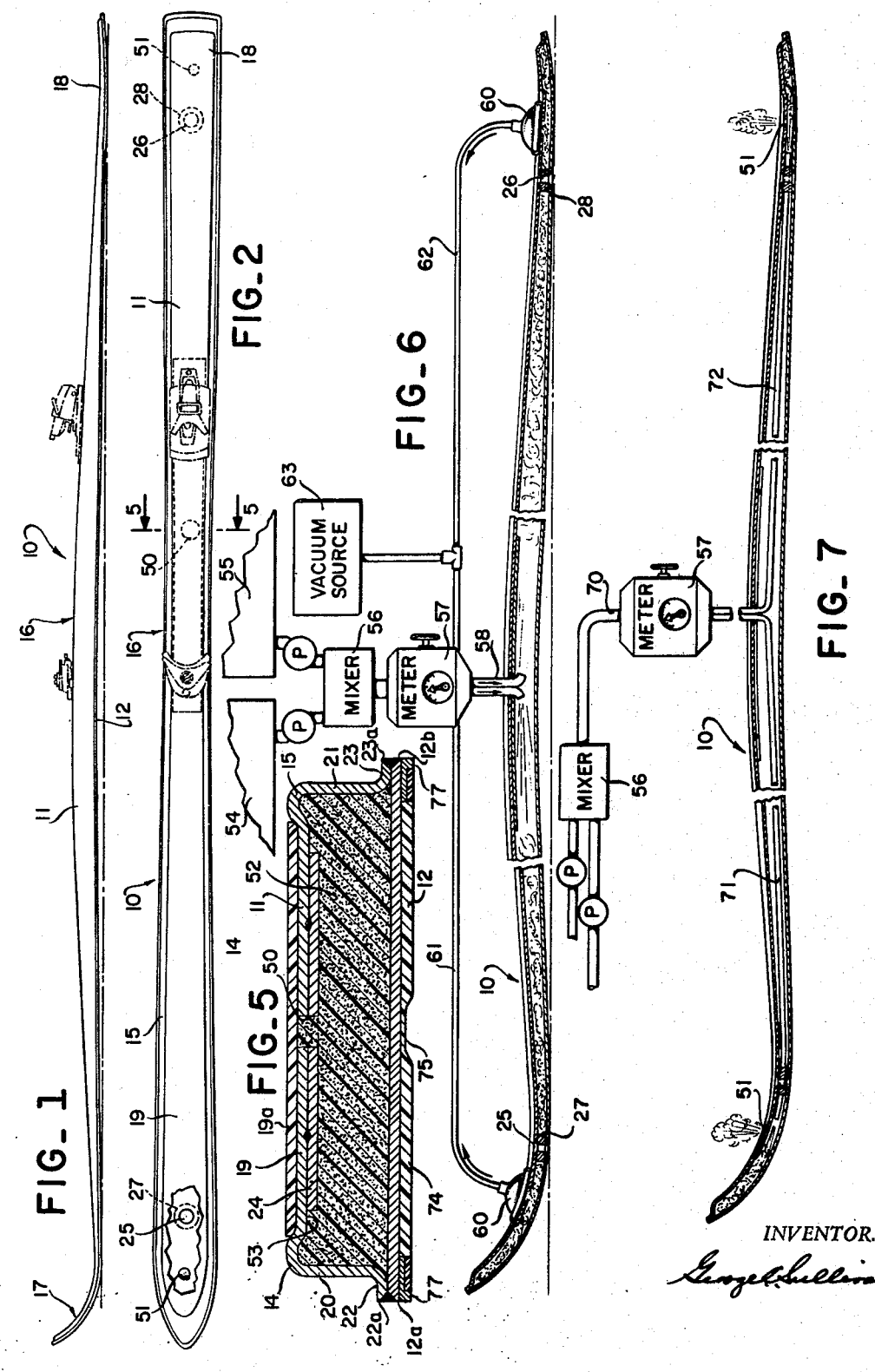
INVENTOR.
George C. Sullivan

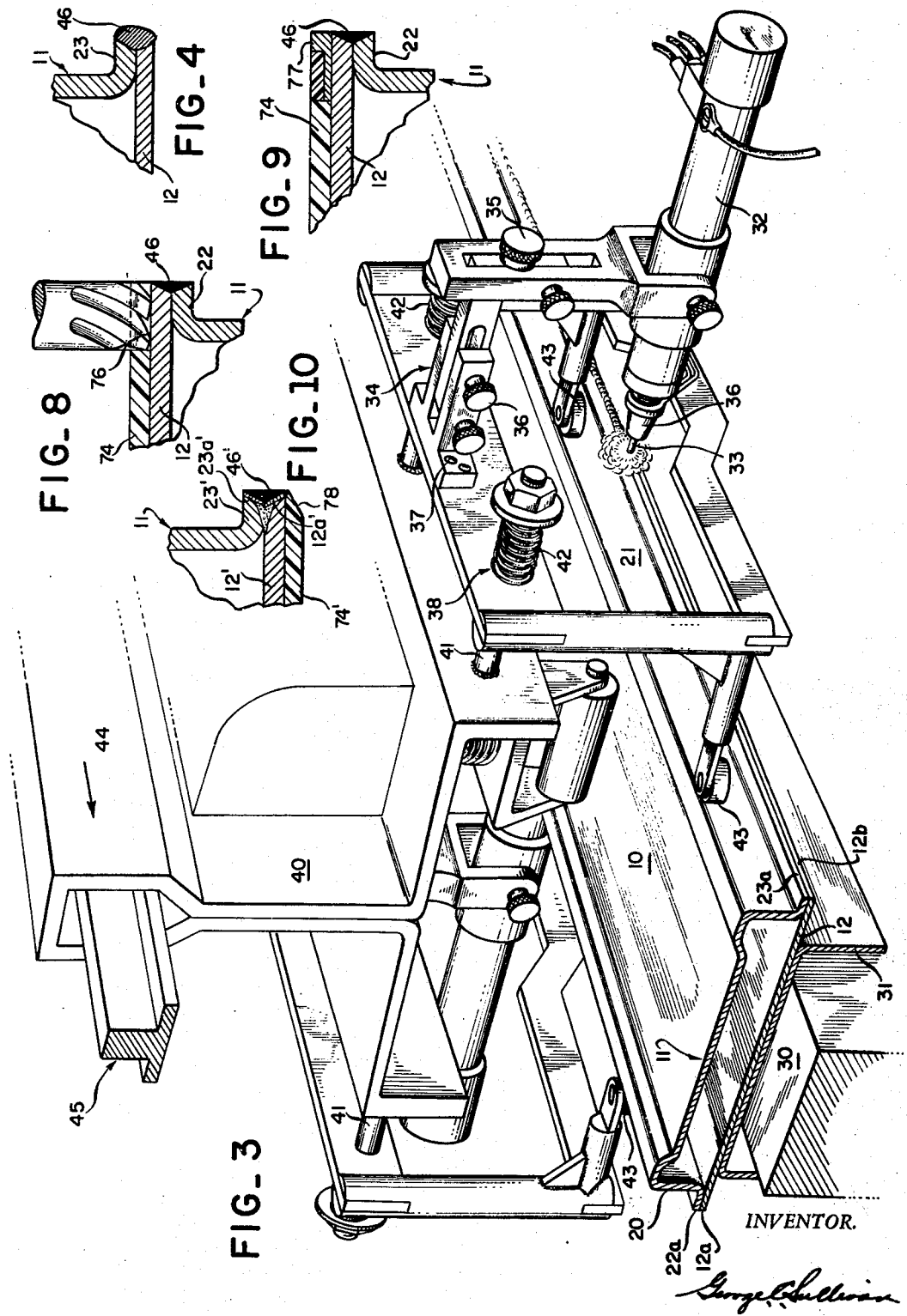

United States Patent Office 3,498,626
Patented Mar. 3, 1970

3,498,626
METAL SKI AND METHOD OF FABRICATION
George C. Sullivan, 4660 Cahuenga Blvd., Apt. 106,
North Hollywood, Calif. 91602
Filed Dec. 14, 1967, Ser. No. 690,484
Int. Cl. A63c 5/00, 5/12
U.S. Cl. 280—11.13    6 Claims

ABSTRACT OF THE DISCLOSURE

A metal and plastic ski and the method of producing the same, preferably utilizing certain metal bonding or welding processes and foamed-in-place plastic core techniques. A U-shaped member is formed in a die, heat treated if necessary, and trimmed to a net dimension. A sheet member is trimmed to a net dimension and attached to the U-shaped member to form a closed rectangular box section, after which the interior of same is filled with a foamed plastic material using foamed-in-situ procedures. The resulting ski is hard anodized in the case of aluminum and colored if desired; after which steel edges and a sheet or sheets of plastic material may be secured to one or the other or both of the upper and lower surfaces, thus producing a practical, high utility, light weight and low-cost metal and plastic ski.

---

This invention relates generally to plastic or preferably metal skis with a cellular plastic core structure, resulting in a ski being lighter in weight, simpler in construction, inexpensive to manufacture and very efficient and durable in use. The presently available modern ski is usually constructed of various woods such as ash, oak, or hickory or a combination of wood, metal and plastic laminae. A severe weight penalty is imposed by these materials, and the manufacture is laborious and expensive.

A box-like structure for the ski is produced by forming (1) a substantially U-shaped member of plastic, steel, or preferably of aluminum, aluminum alloy or other non-ferrous metal, in a die with the use of a press brake, or its equivalent, (2) trimming a bottom or runner member of plastic, aluminum or steel and bonding their edges, preferably by metal bonding (using epoxy adhesive resins) or fusion welding; thus forming a light weight, hollow ski. A cellular plastic core can be tailored and adhesively applied to the interior of the box-like structure but it is preferable to form the same by pouring into the core area a liquid or semi-liquid and then allowing it to react or foam up to form a relatively strong, rigid, light weight mass or core adhering automatically to the adjacent surfaces.

The above described method is an improvement over the teachings of Patent No. 3,208,761 issued to George C. Sullivan and Robert S. Sullivan, on Sept. 28, 1965.

It is an object of this invention to provide a method of manufacture of a ski having at least two parts, one member being substantially U-shaped in cross section and a bottom runner relatively flat and bonded at their edges, such as by metal bonding with epoxy-type resins but preferably by spot or seam welding or more preferably by fusion welding and producing continuous welds along and about the box-like structure.

Still another purpose of the present invention is to foam-in-situ a cellular plastic core into a substantially rectangular cavity by displacing trapped air and gases from a foamed-in-place plastic material, by employing a vacuum and through appropriate vent holes to assist the foamed plastic in completely occupying the entire area of the cavity.

A further object of this invention is to provide a light weight U-shaped upper member having raised or beaded ridges substantially parallel the length of the ski, and having a recessed center portion to receive a bonded polyethylene plastic upper surface, and a bonded polyethylene plastic bottom surface, having a guiding groove in the center and routed portions on each side to receive bonded steel edges.

Other objects and features of the present invention will become apparent from the reading of the following description, especially when considered in combination with the accompanying drawings wherein:

FIGURE 1 is a side elevation of the preferred form of a ski;

FIGURE 2 is a plan view of a ski embodying the present invention;

FIGURE 3 is a fragmentary perspective view showing the preferred welding method used in the metal ski;

FIGURE 4 is a fragmentary cross-section showing the preferred weld;

FIGURE 5 is a cross-sectional view taken at line 5—5 of FIGURE 2;

FIGURE 6 is a longitudinal sectional view of a ski showing a method of foaming in accordance with the teachings of this invention;

FIGURE 7 is a longitudinal sectional view of a ski showing a modified method of foaming the ski of the present invention;

FIGURE 8 is a fragmentary cross-section showing removal of material by routing;

FIGURE 9 is a fragmentary cross-section showing a steel edge in the routed area; and FIGURE 10 is a fragmentary cross-section showing an alternative edge when the lower surface member is of steel material.

Referring to FIGURES 1 and 2, one will find an improved modern ski designated 10, having a generally U-shaped upper member 11, and a lower portion or runner 12, preferably welded at their edges by electric arc fusion methods. In the case of aluminum, I have found alloys numbered 7075 and 6061 to be most practical. The U-shaped member 11, is preferably fabricated of aluminum or aluminum alloy from a flat sheet stock in a press brake or its equivalent and employing a male and female die. The U-shaped member 11 is provided with raised portions or bead-like ridges 14 and 15, which progress longitudinally and outwardly from the bending area 16 to the tip, shovel and upturned portion 17, becoming substantially flat at the tip, and rearwardly and outwardly to the opposite end or tail 18, as best shown in FIGURE 2.

A recessed center section or webbing 19, is provided between ridges 14 and 15 to receive a polyethylene plastic strip 19a adhered to the upper portion of the U-shaped member 11, for protection of the finished ski, later to be described, and flares outwardly as it progresses longitudinally forwardly and rearwardly to the up-turned tip portion and tail portion. Recess 19 associated with ridges 14 and 15 gives added strength and rigidity to the U-shaped member 11. Such recess also permits the plastic covering sheet to be protected from scratching, cutting, etc. while skiing, thus preventing unsightly marks. Side walls 20 and 21 are provided on the U-shaped member 11, having flanges 22 and 23, as best shown in FIGURE 5, which extend outwardly from side walls 21 and 22 and having edges 22a and 23a substantially perpendicular to side walls 20 and 21. Side walls 20 and 21 are reduced in height gradually forwardly and rearwardly from the center or waist portion 16 along the ski for desired flexibility. U-shaped member 11 is now removed from the die and press, treated to effect an appropriate hardness, and trimmed to net dimensions.

A reinforcing plate 24 is attached to the underside of the recess or webbing 19 of the U-shaped member 11, in the area of the skier's boot, preferably by spot welding, thus strengthening the portion of the ski where the greater weight will be applied and the bindings attached. From a flat sheet stock a blank is trimmed to net dimension, substantially in the shape of the U-shaped member 11, in plan view, to produce the lower portion or runner 12 of the ski 10, having edges 12a and 12b. Runner 12 is now heat treated, if not heat treated in its original condition, and secured to the U-shaped member 11 by means such as rivets 25 and 26 having spacers 27 and 28. The U-shaped member 11 and the runner member 12 are now in fixed relationship with respect to each other and can progress to the next step of electric arc welding.

The U-shaped member 11 and the runner member 12 are placed in a holding fixture as best shown in FIGURE 3, where the ski 10 is clamped or otherwise secured (not shown) on a slightly curved support 30 having a copper plate 31 affixed thereon to facilitate the absorption of heat generated by the electric arc welding process.

Electric arc welding torches 32, such as generally described in Patent No. 3,309,492 patented Mar. 14, 1967, are provided in fixed opposite relationship with each other and are positioned so that their electrodes 33 come in contact with the metal edges 12b and 23a of ski 10. Support 34 having adjusting means 35 and 36 are provided to position the welding torches 32 in proper relationship to the ski 10 to produce an appropriate weld. A welding nozzle 36 is provided on torch 32 to allow an inert shielding gas, such as argon or the like, to protect the welding area from deterioration and oxidization. Torch support 34 is fixed, as by bolts 37, to a frame 38 which is slidably mounted to an overhead carrier 40 by rods 41 and spring loaded to force frame 38 inwardly by compression springs 42. Spaced rollers 43 in fixed relationship with frame 38 are pressed into contact with side walls 20 and 21 of ski 10 by compression springs 42 and progress longitudinally along the ski 10 as carrier 40 travels in the direction of arrow 44 supported by a support beam 45 on rollers, or the like (not shown).

It can be readily understood that as rollers 43 follow the side walls 20 and 21 of ski 10, electrodes 33 stay in proper relationship with the metal edges 22a, 23b, and 12a, 12b, as side walls 20 and 21 of ski 10 diminish inwardly and flow outwardly as frame 38 progresses along ski 10.

Electric arc welding is preferably used (although spot-welding or other mechanized fastener means can be utilized), the weld metal is supplied by melting a portion of the base metal of edges 22a and 23a of U-shaped member 10 and 12a and 12b of bottom runner 12 by electrodes 33. Nozzle 36 provides an inert gaseous shield, such as argon, to restrict the access of oxygen and nitrogen to the molten metal. Said molten metal penetrates into the metal effecting a sound fusion welding 46 of continuous beads, as best shown in FIGURE 4, on both sides of the major straight line sections of ski 10.

Upturned toe portion 17 and tail portion 18 may easily be finished by manual welding. As the above described welding method is the preferred one, other metal bonding or welding techniques can be used, such as resistance welding, spot welding or seam welding, by passing the outwardly extending flanges 22 and 23 of the U-shaped member 11, and the lower runner 12 between two wheel-type revolving pressure electrodes.

The welds 46 are now dressed by appropriate procedure such as filing, pin routing or sanding to provide a clean, smooth, continuous welded and finished edge as best shown in FIGURES 8 and 9.

Appropriate plastic foam injection holes 50 and air vent holes 51 are drilled through webbing 19 of the U-shaped member 11. Cellular plastic, such as foamed alkyd resin polyisocyanate plastics, foamed phenolic plastics, or Freon activated polyurethane plastics (preferably polyether materials with Freon blowing agent) etc. are now employed as internal materials or fillers. These cellular materials may be easily poured into cavity 52 and then allowed to react or foam up to form a relatively strong, rigid, light weight mass adhering to the inner adjacent surfaces of cavity 53 which is formed by securing the upper U-shaped member 11 to the bottom runner 12 as previously described.

The preferred method of injecting foam-in-situ plastic is best shown in FIGURE 6 where storage tanks 54 and 55 having pumps to force the liquid plastic into a mixer 56 and through a metering means 57. Tubes or nozzles 58 are provided to inject the plastic foam into the cavity 52 through foam injection holes 50 of ski 10 and allowed to progress longitudinally within said cavity 53, and to foam up and to react, penetrating into the remote areas of the cavity 52 to become locked therein when set and cured. For an extra strong bond between the foam and the metal box section, the inside of said box section can be painted with the foam mixture without the foaming agent.

Suction cups 60 are provided having tubes 61 and 62 which communicate with a vacuum source 63 through negative pressure or suction, to displace trapped air and other gases created by the reaction of the foaming plastics, and to assist the foaming mixture in travelling longitudinally of the ski.

Metering means 57 is regulated to dispense a predetermined amount of foam plastic, the amount depending upon the size of the ski which is being injected.

An alternative method of injecting cellular foam plastic into cavity 52 of ski 10 is best shown in FIGURE 7 of the drawings. Where pumps force plastic liquid from storage tanks (not shown) into mixer 56 and then through a common line 70 to enter metering means 57 under pressure, flexible plastic tubes 71 and 72 can be placed within cavity 52 of ski 10 to the longitudinal extremities of the cavity 52 and as the plastic liquid is allowed to foam up and react, trapped air and other gases created by the reaction of the foaming plastic are dispelled through vent holes 51 provided therefor.

Flexible plastic tubes 71 and 72 are then slowly withdrawn through injection holes 50 until the ends become free and cavity 52 is completely filled with a cellular foamed plastic which, when allowed to cure becomes a rigid or semi-rigid light weight mass which bonds to the interior sides of the box section and thus increases the overall strength of the ski 10. The foamed plastic, having closed cells, also prevents condensation from forming, or water from entering the interior in the case of breakage.

The entire ski 10 may now be hard anodized and dyed appropriate colors for a pleasing eye effect and sales appeal.

The outer surface of recess or webbing 19 of the U-shaped member 11, and the bottom runner 12 can now be prepared by cleaning and roughing of the surface, such as by grinding or sanding to facilitate the adhesion, after which a trimmed to proper size polyethylene plastic upper strip can be bonded, preferably by epoxy adhesive to the upper recessed webbing 19 between ridges 14 and 15, thus to protect the top surface of ski 10.

A second polyethylene plastic strip 74 is bonded, preferably by epoxy adhesive, to the bottom side of runner 12. A guiding groove 75 is provided by milling or routing into the center of plastic strip 74, and it progresses longitudinally substantially the length of the ski to feather or diminish at the upturned toe portion. The plastic strip 74 is now trimmed flush with edges 12a and 12b of the bottom runner 12.

A rectangular channel 76 is now routed to appropriate dimensions, longitudinally along the outside edges of plastic strip 74, as best shown in FIGURE 8, to receive a bonded steel edge 77, as best shown in FIGURE 9, thus providing a hardened, sharp edge preferred by most qualified skiers. Said steel edge may be bonded also by epoxy adhesive and can be sharpened by the skier as needed.

Another alternative construction of my invention is a method of producing a ski having hardened, sharp steel edges and yet simple and inexpensive to manufacture. Reference is made to FIGURE 10.

A fabricated aluminum alloy U-shaped member 11 having outwardly projecting flange 23′ is secured to bottom runner 12′ which may be of steel material at the edges 12a′ and 23a′ by a bi-metallic brazing process forming welds 46′; this process now being known to those skilled in the art. This process welds two metals of different properties, i.e., aluminum and steel, to produce a sound, strong fastening having a hardened steel edge which can be sharpened by the skier as necessary. Bottom runner 12′ may be formed to produce a webbing in the same manner as recess 19 of the upper member 11, which recess can be covered by a plastic strip 74 if so desired.

Polyethylene plastic strip 74′ having beveled outside edges 78, may be bonded to the steel runner 12′ to provide a finished surface for ski 10, which can be waxed to minimize friction resistance.

The last step is to clean and polish said ski 10 with buffing and polishing means well known in the art, applying identifying markings such as brand names, length of ski, and other decorations. The ski is now inspected for quality of manufacture and workmanship.

Having thus described my invention what I claim is:
1. A lightweight ski comprising:
 (a) an upper U-shaped member including an upper surface,
 (b) a lower member including a lower surface and side edges,
 (c) the legs of said U-shaped member tapering in elevation forwardly and rearwardly from about the mid-section of said ski to form a substantially rectangular cavity of decreasing cross-section,
 (d) said upper surface of said U-shaped member including a recess for receiving a protective strip,
 (e) said lower member secured to said upper member and forming a closure for said cavity,
 (f) said cavity having a core of closed cell, cellular plastic which is foamed in situ and adheres to the adjacent inner surfaces of said members,
 (g) said U-shaped member including end flanges extending outwardly and parallel to the side edges of said lower member,
 (h) said flanges of said U-shaped member and said side edges of said lower member being bonded together, and
 (i) a flat reinforcing plate secured to the underside of said U-shaped member only.
2. A light-weight ski as in claim 1 and including:
 (a) a bottom protector covering bonded to the outer surface of said lower member and coincident therewith.
3. A light-weight ski as in claim 1 and wherein:
 (a) said bonded together flanges and edges each include a reinforcing edge.
4. A light-weight ski as in claim 1 and wherein:
 (a) said bonded together flanges and edges are each welded, and include,
 (b) a steel reinforcing edge.
5. A light-weight ski as in claim 1 and wherein:
 (a) said lower member is made of a steel material.
6. A light-weight ski as in claim 5 and wherein:
 (a) said lower member includes a bottom protector covering.

References Cited
UNITED STATES PATENTS

| | | | |
|---|---|---|---|
| 2,753,642 | 7/1956 | Sullivan | 264—45 XR |
| 2,851,277 | 9/1958 | Holmberg et al. | |
| 3,090,078 | 5/1963 | Ackles | 264—45 |
| 3,151,873 | 10/1964 | Riha. | |
| 3,208,761 | 9/1965 | Sullivan et al. | |
| 3,242,240 | 3/1966 | Tantlinger | 264—45 |
| 3,352,566 | 11/1967 | Kennedy. | |
| 3,360,277 | 12/1967 | Salvo. | |

FOREIGN PATENTS

| | | |
|---|---|---|
| 655,338 | 1/1963 | Canada. |
| 675,430 | 12/1963 | Canada. |
| 87,478 | 7/1966 | France. |
| 1,483,838 | 5/1967 | France. |

LEO FRIAGLIA, Primary Examiner

MILTON L. SMITH, Assistant Examiner

U.S. Cl. X.R.
156—79, 286; 264—45